J. ISRAEL.
FLOWER BOX.
APPLICATION FILED APR. 27, 1917.

1,251,234. Patented Dec. 25, 1917.

WITNESSES
Frank C. Palmer
C. F. Murdock

INVENTOR
Joseph Israel
BY Munn & Co
ATTORNEYS

UNITED STATES PATENT OFFICE.

JOSEPH ISRAEL, OF NEW YORK, N. Y.

FLOWER-BOX.

1,251,234.     Specification of Letters Patent.     Patented Dec. 25, 1917.

Application filed April 27, 1917. Serial No. 164,867.

*To all whom it may concern:*

Be it known that I, JOSEPH ISRAEL, a citizen of the United States, and a resident of the city of New York, borough of the Bronx, in the county of Bronx and State of New York, have invented a new and Improved Flower-Box, of which the following is a full, clear, and exact description.

Among the principal objects which the present invention has in view are: to avoid the accumulation of liquid adjacent the roots of a plant growing in a box of the character mentioned; to maintain the earth in which the plant grows in moist condition; to permit the removal of surplus liquid; to provide a decorative cover for boxes of the character mentioned during periods in the surface thereof; and to provide means for aerating the earth contained in the boxes mentioned.

*Drawings.*

*Description.*

Figure 1:
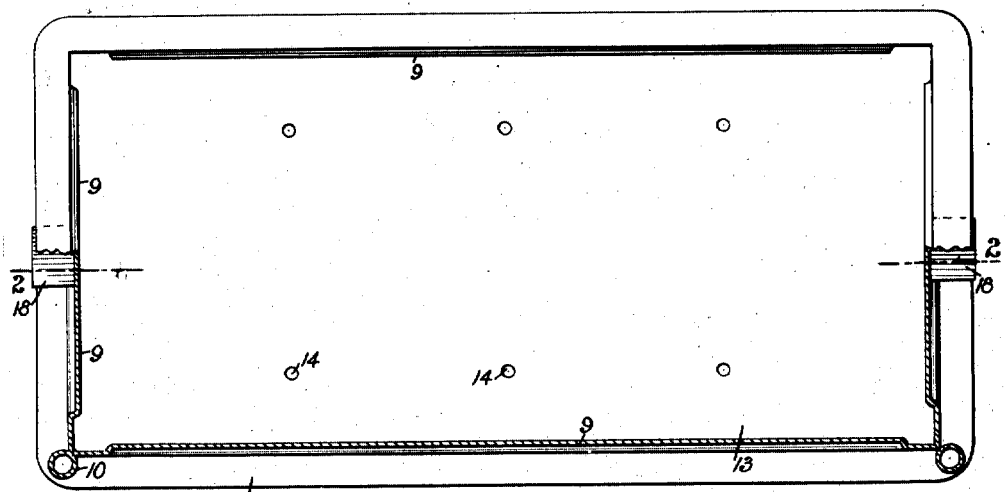
Figure 1 is a top plan view partly in section showing a box of the character mentioned constructed and arranged in accordance with the present invention.

As seen in the drawings, the preferred form of box is one constructed of sheet metal, the sides whereof are pressed to form panels 9. The metal from which the panels 9 are constructed is bent at the corners to form pillars 10. The pillars 10 serve to reinforce the box construction and to support the top and bottom flanges 11 and 12, respectively. The flanges 11 are preferably made as an integral part of the sides having the panels 9. The flange 12 is an extension of the bottom 13. The bottom 13 has a series of perforations 14. The perforations 14 permit the passage of water which might accumulate at the bottom of the box, said perforations opening through the said bottom into the drawer or removable box 15. The box 15 has supporting flanges 16, which rest over and are supported by rails 17. It is evident that if the water in the box 15 is in danger of overflowing, said box may be removed from its service position and emptied before being replaced.

If the box herein disclosed is being utilized for growing plants requiring certain conditions of moisture in the ground in which they grow, this may be supplied by allowing an accumulation or a fresh supply of free water to be held in the box 15.

For purposes of transportation, the flower box is provided with handles 18.

Figure 2:
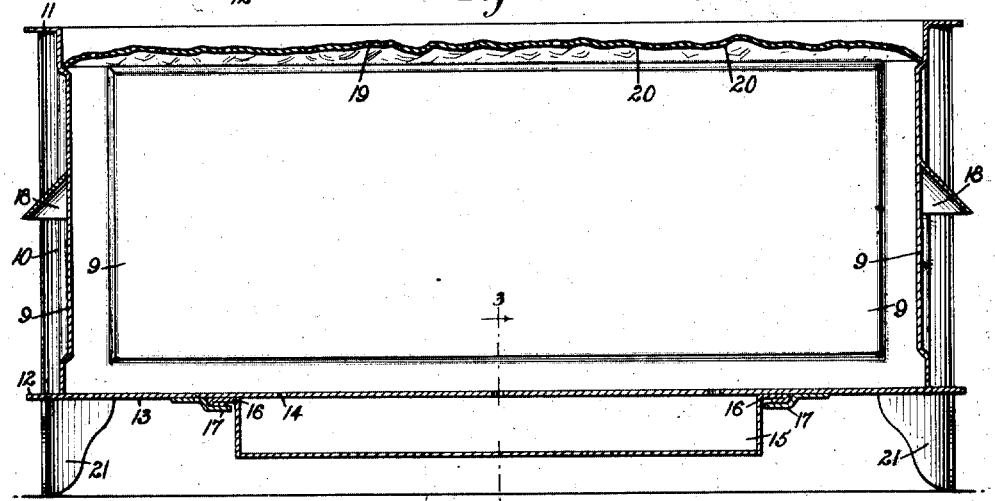
Fig. 2 is a vertical section thereof, the section being taken as on the line 2—2 in Fig. 1 and showing in conjunction therewith a false or sham top.
Figure 3:
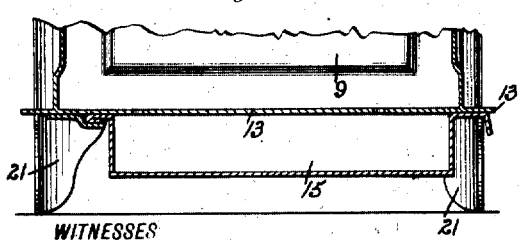
Fig. 3 is a cross section taken as on the line 3—3 in Fig. 2.
Figure 4:
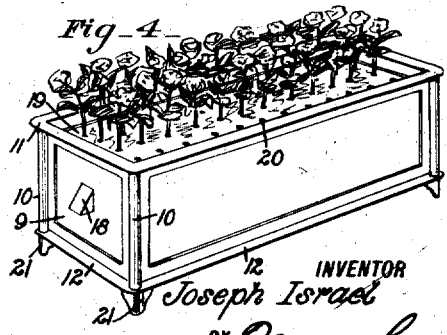
Fig. 4 is a perspective view of a box of the character mentioned constructed and arranged in accordance with the present invention.

As shown in Fig. 4 of the drawings, the box is sometimes supplied with a false or imitation top 19. The top 19 is suitably perforated to form supports for artificial flowers. The supports are perforations 20 into which the stems of the flowers may be inserted or from which the said stems may be withdrawn. The top 19 when in service rests as shown best in Fig. 2 of the drawings, on the inwardly-pressed edges of the panels 9.

The flower box is supported on legs 21. The legs are of suitable length to maintain the box 15 off the floor or other surface on which the flower box rests.

It is known to be advantageous to admit air to the roots of potted or boxed plants. In the present form of the invention this is provided for by means of the perforations 14. It is evident that when the box 15 is supplied with water, the aeration of the earth containing the roots is performed with the greatest advantage for the reason that the air admitted is moistened by the water in the box. While the box 15 has hereinbefore been described as containing free water, it will be understood that a sponge or other absorbent material may be disposed in the box and operate to retard the evaporation of the water, and in this manner conserve the moisture in the box 15 for a longer period.

*Claim.*

An article as characterized comprising a box-like receptacle constructed from sheet metal having forwardly pressed panel portions forming supporting ledges adjacent the top thereof and shaped at the corners to form supporting posts integrally formed with the sides of said receptacle; a plurality of carrying handles rigidly mounted on said receptacle; and means for draining water from said receptacle, said means embodying a perforated bottom for said receptacle and an auxiliary box-like member removably mounted on said box-like receptacle.

JOSEPH ISRAEL.